Patented Aug. 9, 1938

2,126,009

UNITED STATES PATENT OFFICE 2,126,009

AMINO-CHLORODIPHENYL DERIVATIVES

Morton Harris, Anniston, Ala., assignor, by mesne assignments, to Monsanto Chemical Company, a corporation of Delaware No Drawing. Application March 21, 1935, Serial No. 12,253

6 Claims. (Cl. 260—130.5)

The present invention comprises derivatives of chlorodiphenyl and particularly the 4-amino-2'-chlorodiphenyl derivative and compounds thereof.

I have found that 4-nitro-2'-chlorodiphenyl can be reduced to give good yields of 4-amino-2'-chlorodiphenyl. The following method may be employed.

Five hundred and fifty grams of 4-nitro-2'-chlorodiphenyl, 350 grams of benzol and 500 grams of freshly treated iron (made by adding 69 grams of strong HCl and 20 grams of water to 500 grams of iron filings, followed by drying in the cold) are charged into a reducer and the mixture heated under reflux while stirring for a period of two hours. Forty-four grams of water are then added in 11-gram portions every 15 minutes. The refluxing and stirring are continued for two hours after the last water addition, and the reduction mixture is allowed to stand overnight. The reduced solution is then refluxed with 300 c. c. of 15% sodium carbonate solution for thirty minutes. The benzol layer containing the amine is then decanted from the top of the mixture and filtered.

The benzol-amine solution is now treated with an excess of 10% sulfuric acid. The insoluble sulfate of 4-amino-2'-chlorodiphenyl is filtered off, washed twice with benzol, and then dried. The amine sulfate is again boiled in 2 liters of 5% sulfuric acid in which the material is practically insoluble, and filtered.

The product is now boiled in 1.5 liters of 20% sodium hydroxide solution. The decomposition of the sulfate is slow, but may be hastened by the addition of ammonia water. In about thirty minutes the reaction is complete and the free 4-amino-2'-chlorodiphenyl separates as a brownish, transparent oil having a refractive index of 1.656 at 20° C.

The oil is now fractionated and boils at a temperature of 182° to 183° C. under a vacuum of 3 to 4 millimeters.

This compound has the structural formula:

Sulfate of 4-amino-2'-chlorodiphenyl

Several grams of the amine oil are warmed with an excess of dilute sulfuric acid. An insoluble amine sulfate is formed which is filtered, washed with water, and then boiled with 95% ethyl alcohol. The compound is only slightly soluble in the alcohol. The suspension is cooled, the sulfate filtered off and air dried.

Analysis=19.88% $H_2SO_4$.

Theory for normal sulfate=19.35% $H_2SO_4$.

The structural formula of this compound is:

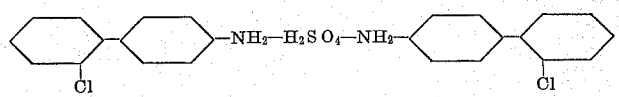

Nitrate of 4-amino-2'-chlorodiphenyl

Several grams of the amine oil are warmed with an excess of dilute nitric acid. The insoluble nitrate is filtered off and washed with water. It is recrystallized by dissolving in boiling 95% ethyl alcohol, followed by cooling. Needle crystals of the nitrate of 4-amino-2'-chlorodiphenyl are recovered by filtration of the cold alcohol solution.

Analysis=23.53% $HNO_3$
Theory=23.60% $HNO_3$.

This compound has the structure:

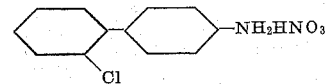

Hydrochloride of 4-amino-2'-chlorodiphenyl

Several grams of the amine oil are warmed with an excess of dilute hydrochloric acid. The insoluble amine hydrochloride is filtered off and washed with water. The hydrochloride may then be recrystallized by dissolving in boiling 95% alcohol and cooling. The compound forms long, fine, needle-like crystals which are filtered off and vacuum dried.

Analysis=15.16% HCl.
Theory=15.16% HCl.

The structural formula is:

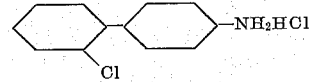

Acetyl derivative of 4-amino-2'-chlorodiphenyl

Several grams of the amine oil are boiled for one minute with an excess of acetic anhydride. The product is taken up with water and the crystallized product filtered off. The acetyl derivative may be recrystallized twice from 95% alcohol. The product forms needle crystals.

Melting point=161.5° to 162.5° C.

The structural formula is

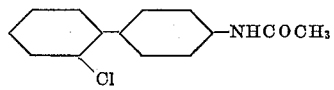

The 4-amino-2'-chlorodiphenyl and its derivatives may be employed for a variety of purposes, such as rubber accelerators, anti-oxidants for rubber, gasoline, and other hydrocarbon products, or as a raw material for the synthesis of dyes and pharmaceuticals.

Being crystalline materials, the derivatives of 4-amino-2'-chlorodiphenyl may be flaked or spherodized for convenience in shipment or in use.

Having now particularly described my invention and the manner in which it may be performed, I am desirous that it not be limited, except as indicated by the prior art or as particularly pointed out in the claims.

What I claim is:

1. As a new compound, 4-amino-2'-chlorodiphenyl.
2. An inorganic acid addition salt of 4-amino-2'-chlorodiphenyl.
3. A compound selected from the group consisting of 4-amino-2'-chlorodiphenyl and its inorganic acid addition salts.
4. As a new compound, the sulfuric acid addition salt of 4-amino-2'-chlorodiphenyl.
5. As a new compound, the hydrochloride of 4-amino-2'-chlorodiphenyl.
6. As a new product, a crystalline addition product of an inorganic acid and 4-amino-2'-chlorodiphenyl in flake form.

MORTON HARRIS.